No. 874,243.　　　　　　　　　　　PATENTED DEC. 17, 1907.
M. R. RITTS.
HORSE DETACHER.
APPLICATION FILED APR. 24, 1907.

2 SHEETS—SHEET 1.

Witnesses
L. L. Armstrong.
John Bowers.

Inventor
Michael R. Ritts
By Chandler & Chandler
Attorneys

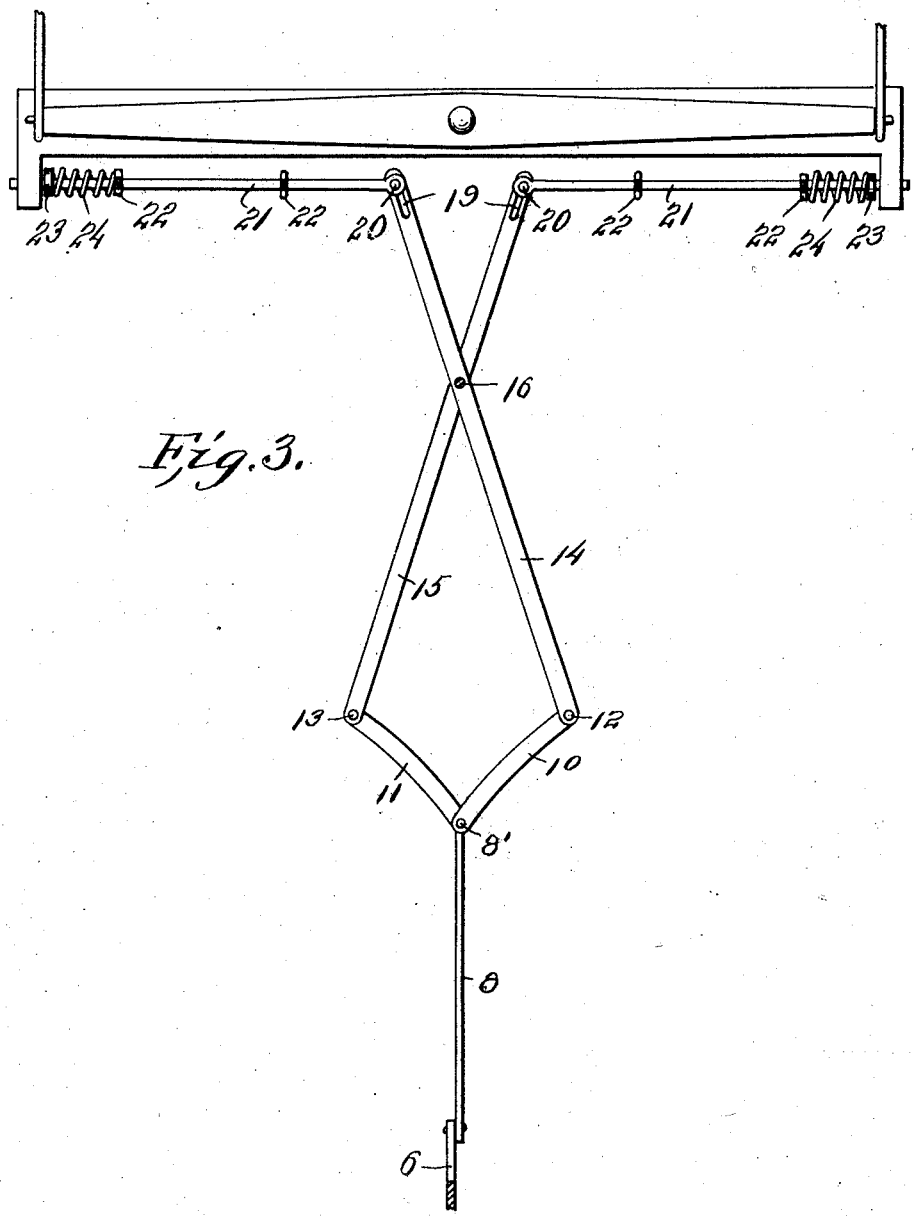

UNITED STATES PATENT OFFICE.

MICHAEL R. RITTS, OF McCLURE, SOUTH DAKOTA.

HORSE-DETACHER.

No. 874,243.	Specification of Letters Patent.	Patented Dec. 17, 1907.

Application filed April 24, 1907. Serial No. 370,010.

*To all whom it may concern:*

Be it known that I, MICHAEL R. RITTS, a citizen of the United States, residing at McClure, in the county of Lyman, State of South Dakota, have invented certain new and useful Improvements in Horse-Detachers; and I do hereby declare the following to be a full, clear, and exact description of the invention, such as will enable others skilled in the art to which it appertains to make and use the same.

This invention relates to new and useful improvements in horse detachers, and it has particular reference to a manually operated device for releasing the element which carries the swingle tree whereby the horse may withdraw from the shafts of the vehicle without danger to the occupants thereof.

In connection with a device of the above type, the invention aims as a primary object to provide a novel combination, construction and arrangement of parts, the details of which will appear in the course of the following description, in which reference is had to the accompanying drawings forming a part of this specification, like characters of reference designating similar parts throughout the several views, wherein:—

Figure 1:
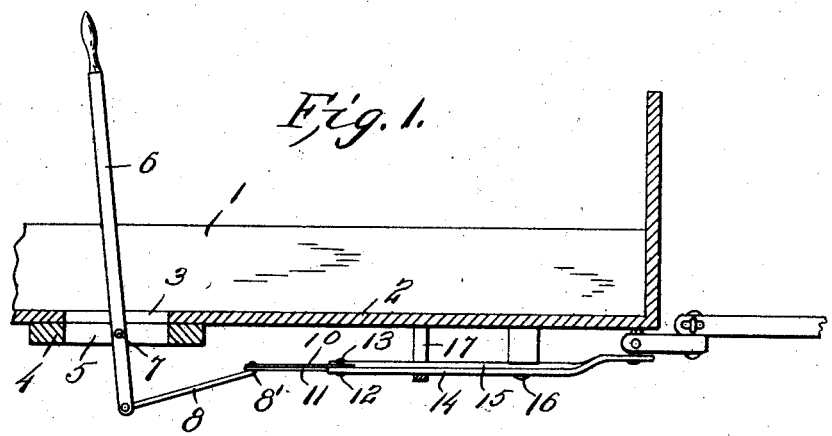
Figure 2:
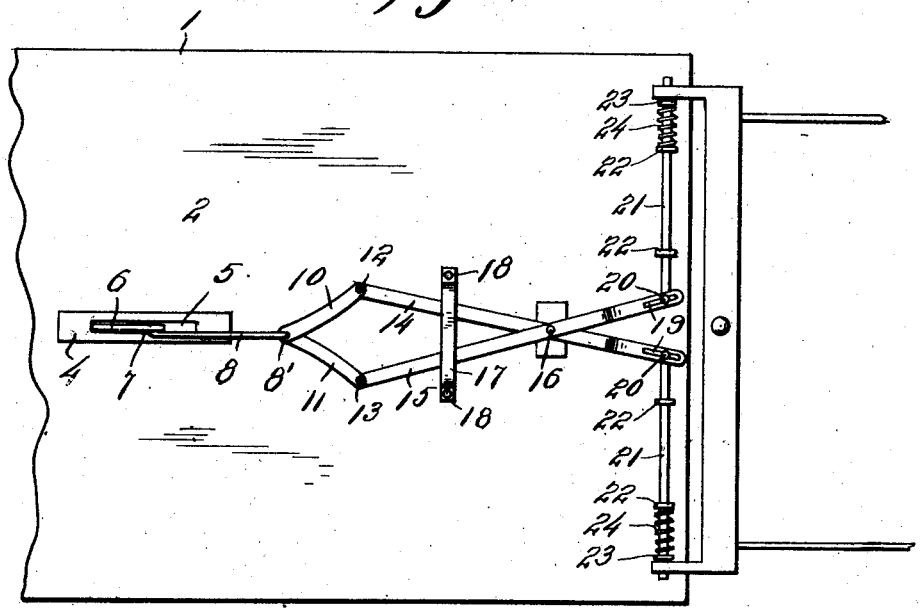

Figure 1 is a fragmentary longitudinal section illustrating a vehicle constructed in accordance with my invention. Fig. 2 is an underneath plan view thereof. Fig. 3 is a plan view of the device embodied in the present invention and detached from the vehicle to more clearly show the construction and arrangement of the parts.

In the accompanying drawings the numeral 1 indicates a vehicle, having a floor 2, provided with a slotted opening 3, a block 4 being mounted on the underneath side of said floor and having a slotted opening 5 registering with the slot 3. A lever 6 is projected through the openings 3 and 5, and is pivoted by means of a transverse pin 7 in the block 4. Said lever at its lower end has pivotal connection with a link 8 designed for reciprocating movement.

The link 8 at its front end has pivotal connection as at 8', with the rear ends of two links 10 and 11, said links constituting part of a lazy-tongs mechanism, and being accordingly pivoted as at 12 and 13, to links 14 and 15 which are pivoted to one another at points along their body portion as at 16. A strap 17 is fixed to the underneath surface of the floor by fastening means 18 passing through the angular ends of said strap, said strap being disposed beneath the rear portions of the links 14 and 15, and guiding the same in their movements on the pivot 16. It is preferred that the pivot 16 be fixed, preferably by connection with the floor 2 or stationary part of the vehicle. The links 14 and 15 at their front ends are formed with slots 19, through which are projected pins 20, the latter constituting pivots for sliding members 21. The members 21 are supported from the front part of the vehicle in guide brackets 22, and are designed to have their free ends projected through openings in the element which carries the swingle tree and by means of which the vehicle is hitched. The members 21 adjacent their free ends are formed with beads 23, and expansive coil springs 24 surround said members, said springs being interposed between said beads 23 and the adjacent guide brackets 22 and tending to force the members 21 outwardly whereby they will be maintained in engagement with the hitching elements as above set forth.

Should the horse become fractious, or run away, the lever 6 is pushed forwardly on its pivot 7, so that its lower end is thrown rearwardly. This action draws the link 8 rearwardly, and through the connections described, both ends of the links 14 and 15 are moved toward one another. When the links 14 and 15 are thus moved, the members 21 are moved toward one another, their free ends being withdrawn from the hitching elements, thus allowing the horse to run free of the vehicle.

From the foregoing description, it will be seen that simple and efficient means are provided for accomplishing the objects of the invention, but while the elements herein shown and described are well adapted to serve the functions set forth, it is obvious that various minor changes may be made in the proportions, shape and arrangement of the several parts without departing from the spirit and scope of the invention, as defined in the appended claims.

What is claimed is:

A device of the type set forth, comprising an operating lever pivoted to a stationary object along its body portion, a link pivoted to the lower end of said lever and at its other end having common pivotal connection with the end links of a lazy-tongs mechanism, said lazy-tongs mechanism including cross links pivoted to one another along their body portion, and pivoted to the ends of said end links, the pivot of said cross links being stationary, said cross links being provided at their other ends with slots, sliding members supported from the vehicle and adapted for engagement with an element which carries the swingle tree, and pivotal connections engaging in said slot between said sliding members and said cross links.

In testimony whereof, I affix my signature, in presence of two witnesses.

MICHAEL R. RITTS.

Witnesses:
G. E. SUMNER,
A. M. GANO.